S. F. BRIGGS.
REGULATOR FOR CHARGING STORAGE BATTERIES.
APPLICATION FILED FEB. 12, 1915.
1,262,917.
Patented Apr. 16, 1918.
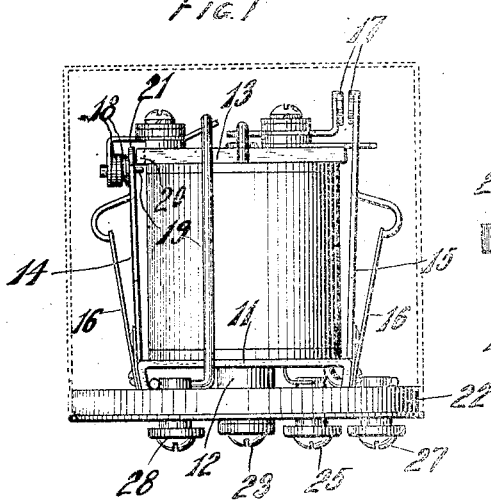
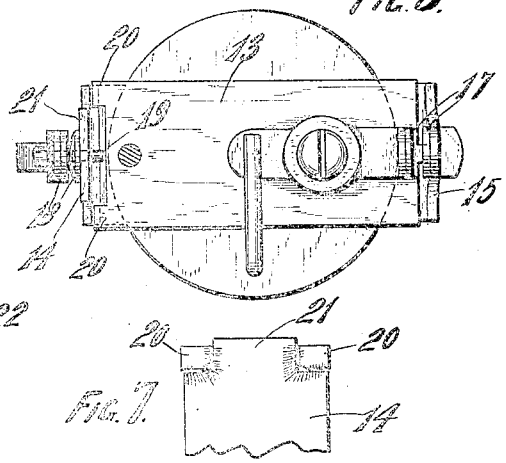
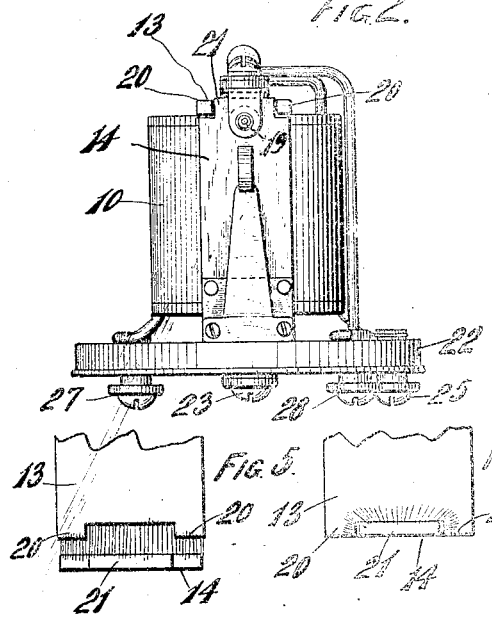
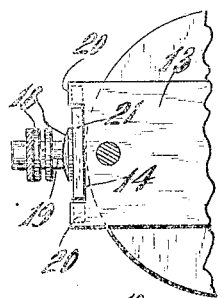
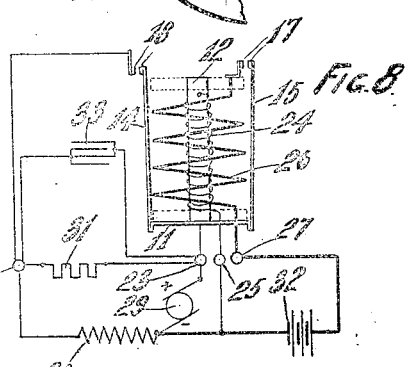
WITNESSES.
INVENTOR
Stephen F. Briggs.
By R. S. Caldwell
ATTORNEY

UNITED STATES PATENT OFFICE.

STEPHEN F. BRIGGS, OF MILWAUKEE, WISCONSIN, ASSIGNOR TO BRIGGS & STRATTON COMPANY, OF MILWAUKEE, WISCONSIN, A CORPORATION OF WISCONSIN.

REGULATOR FOR CHARGING STORAGE BATTERIES.

1,262,917.  Specification of Letters Patent.  Patented Apr. 16, 1918.

Application filed February 12, 1915. Serial No. 7,769.

*To all whom it may concern:*

Be it known that I, STEPHEN F. BRIGGS, a citizen of the United States, and resident of Milwaukee, in the county of Milwaukee and State of Wisconsin, have invented new and useful Improvements in Regulators for Charging Storage Batteries, of which the following is a description, reference being had to the accompanying drawings, which are a part of this specification.

This invention relates to vibrating regulators for controlling the charging of storage batteries with electrical current ranging in voltage between narrow limits from a generator driven at widely varying speeds, and has for its object to render such a regulator more constant in its operation so as to maintain its regulating vibrations under all working conditions. Another object of the invention is to accomplish this result by the use of a vibrator pole piece and armature so constructed and arranged that after the initial movement of the armature toward its attracted position a part of the magnetic flux or the direction of flow of some of the lines of force is approximately at right angles to the direction of movement of the armature, thus diminishing the attractive force of the magnet and permitting the armature retracting means to become more effective.

With the above and other objects in view the invention consists in the regulator for charging storage batteries as herein claimed, and all equivalents.

Referring to the accompanying drawings in which like characters of reference indicate the same parts in the different views:

Figure 1 is a side view of a vibrating regulator constructed in accordance with this invention;

Fig. 2 is an end view thereof;

Fig. 3 is a plan view thereof with the stationary contact holder sectioned, and with the armature in its outer position;

Fig. 4 is a similar view of a fragment of the device with the armature in its extreme inner position;

Fig. 5 is an outline plan view of the pole piece and armature showing the direction of the lines of force in the outer position of the armature;

Fig. 6 is a similar view showing the direction of the lines of force in the extreme inner position of the armature;

Fig. 7 is a similar view in elevation showing the same; and

Fig. 8 is a diagram showing wiring connections.

In these drawings 10 indicates a magnet spool having a pole piece 11 mounted on its core 12 at one end, and a pole piece 13 mounted on its core at the other end. To the bent ends of the pole piece 11 are pivotally connected armatures 14 and 15 by means of flexible spring plates, and these armatures coöperate with the pole piece 13 so as to be attracted thereby when the magnet is sufficiently energized to overcome the action of springs 16 tending to hold them away. The armature 15 effects the opening and closing of switch contacts 17, one of which is carried thereby, and the other of which is mounted on and insulated from the pole piece 13. The other armature 14 controls the opening and closing of a pair of contacts 18, one of which is carried thereby, and the other of which is mounted on and insulated from the pole piece 13, and unlike the contacts 17, which are engaged by the attraction of the armature by the magnet, these contacts 18 are separated by the attraction of armature 14 by the magnet. The contacts 18 are preferably, though not necessarily, of the type covered by my co-pending application Serial No. 866,232, filed October 12, 1914, consisting of three contact disks mounted on an insulating pin 19 which may be fixed on the stationary disk and loosely pass through the other two disks and through an opening in the armature 14 as well. The present invention does not relate to the specific form of these contacts 18, and any other contacts may be substituted therefor, though it is found in practice that these contacts contribute greatly to a continuous uninterrupted operation of the vibrating regulator.

The novel feature of this invention consists in an overlapping relation between the armature 14 and the pole piece 13, and this is preferably accomplished by cutting away the middle portion of the edge of pole piece 13 and the corner portions of the edge of armature 14, or otherwise rendering said parts complementary and interfitting so that they have close fitting faces in planes substantially parallel with the line of movement of the armature. The construction as shown produces a pair of horns or projections 20 at the ends of the active face of the pole piece 13, and a central projection 21 on the end of the armature 14 to closely fit between said horns or projections 20. In the outer position of the armature 14 in which its projection 21 is wholly outside of the space between the horns 20 the formation of these active faces of the armature and pole piece has but little, if any, effect on the attraction of the pole piece for its armature, but as the armature is drawn closer to the pole piece, bringing its projection 21 between the horns or projections 20 of the latter, the direction of the lines of force changes as between the projection 21 and the projections 20, so as to lie in planes approximately at right angles to the line of direction of the armature, as shown in Figs. 6 and 7, instead of parallel thereto, as shown in Fig. 5, so that the attractive force of the pole piece is diminished, rendering the return of the armature to its outer position by the spring 16 more easily accomplished.

The magnet spool 10 is mounted on a base 22 and has a binding post 23 connected with its core 12. The spool is wound with numerous turns of fine wire forming a shunt magnet coil 24 with one end grounded on the core of the magnet, and the other end connected with a binding post 25. The spool is also wound with a few turns of large wire forming a series coil 26 with one end connected with the stationary contact 17 and the other end connected with a binding post 27. Another binding post 28 is connected with the stationary contact 18.

In connecting up the regulator of this invention with a generator and storage battery the binding post 23 is connected with one terminal of the generator armature 29, say the positive terminal, while the other terminal thereof is connected with one end of the shunt field winding 30, its other end being connected to the binding post 28. A field regulating resistance 31 is connected between the binding posts 23 and 28 and a storage battery 32 has one terminal connected with the binding post 27 and the other terminal connected with the negative terminal of the generator armature. It will be seen that the shunt magnet coil 24 is permanently connected across the terminals of the generator armature, whereas the series magnet coil 26 is included in series with the storage battery in a circuit controlled by the contacts 17, and the shunt field winding 30 of the generator is permanently connected across the terminals of the armature of the generator with or without the resistance 31 in series therewith, according to the position of the vibrator contacts 18 which merely serve to short circuit said resistance. If desired, a condenser 33 may be connected across the vibrator contacts 18, as by connecting the terminals thereof with the binding posts 28 and 23 respectively.

In operation the rotation of the generator armature 29 which may be driven in any suitable manner, as by a gearing connection with an automobile engine or the like, causes a flow of current through the shunt magnet coil 24, as well as through the shunt field winding 30 without the resistance 31 in series therewith, vibrator contacts 18 being closed, but without current passing through the series magnet coil 26 or the storage battery 32, as the switch contacts 17 are open, and this condition continues until the speed of rotation of the armature is such that the voltage generated thereby is sufficient for the purpose of charging the storage battery. When such voltage is reached the current strength is sufficient to cause the shunt magnet coil 24 to energize the magnet to a degree that will enable it to attract the armatures 14 and 15 against the action of their springs. The closing of the switch contacts 17 closes the charging circuit through the storage battery and increases the strength of the magnet by energizing the series magnet coil 26 while the opening of the vibrator contacts 18 serves to weaken the field winding of the generator by including the resistance 31 in series therewith, thus causing the voltage of the generator to drop and reduce the attractive force of the magnet so as to release the armature 14 to again short circuit the resistance 31 and restore the strength of the field winding of the generator and permit the armature to again attain its maximum voltage. This operation is rapidly repeated from which fact the device is designated as a vibrator. The voltage of the battery charging circuit is thus prevented from exceeding a predetermined maximum voltage even though the speed of rotation of the armature of the generator varies widely. The contact points 17 remain closed as long as the armature speed is sufficient to maintain the predtermined voltage for the battery charging circuit, but as soon as it falls below this speed the resulting loss of strength of the magnet permits the contacts 17 to open and thus prevent a discharge of the storage battery. In the event of a delayed opening action of the contacts 17 permitting the generator voltage to fall below the battery voltage the battery current in discharging through the series coil 26 causes it to oppose or tend to neutralize the effect of the shunt coil 24 and thus weaken the magnet to facilitate the opening of the switch contacts 17.

The difficulty which is common to vibrators of this type is that the vibrator armature will occasionally stick to the pole piece and thus fail to give regulation. While its approach to the pole piece is accompanied by the opening of the switch contacts to introduce resistance in the field circuit of the generator and thus reduce the voltage of the generator circuit and weaken the magnet, the battery circuit through the magnet is not affected and at times when the battery is nearly charged this is sufficient together with the increased pull of the magnet due to the reduction of the air gap to hold the attracted armature notwithstanding such introduction of resistance. The construction of the vibrator armature and pole piece by which they overlap to an increasing extent as the armature approaches its attracted position serves to weaken the attractive force of the magnet in addition to the weakening by the drop of voltage due to the introduction of the resistance 31 in the generator field circuit, and thus prevents the armature being held in its attracted position and assures its prompt return to its outer position immediately upon the disengagement of the contacts 18. Uninterrupted operation of the vibrator contacts is thus assured, resulting in a continuous regulation of the voltage of the storage battery charging circuit for the protection of the storage battery at all speeds of the generator.

It is obvious that the particular manner of obtaining the overlapping relation between the vibrator armature and the pole piece which is here illustrated and described for the purpose of exemplifying the invention is not essential to the invention which contemplates other modes of accomplishing the overlapping relation or deflection of the lines of force to reduce the attractive effort of the magnet, as will readily appear to those skilled in the art, and the invention is not confined in its use to automobiles but is suitable for central station work as well, or wherever voltage regulation is required or magnetically controlled contacts are employed.

What I claim as new and desire to secure by Letters Patent is:

1. In a regulator for battery charging circuits, a vibrator, comprising a magnet having pole pieces, a pivotally mounted armature bridging the gap between the pole pieces, one of the pole pieces and the armature interfitting with each other so as to have an increasing overlapping relation reducing the attractive force of the magnet as the armature approaches its attracted position, and contacts engaged and disengaged by the movements of the armature.

2. In a regulator for battery charging circuits, a vibrator comprising an electromagnet having pole pieces, a movable armature for bridging the gap between the pole pieces, one of the pole pieces and the armature being interfitting so as to have an increasing overlapping relation as the armature approaches its attracted position to weaken the influence of the magnet on the armature, a pair of switch contacts opened and closed by the movements of the armature, yielding means tending to hold the armature away from the magnet and the contacts closed, a generator for supplying electric current to the magnet and having a battery charging circuit, and means for reducing the voltage of the magnet circuit and the battery charging circuit and controlled by the switch contacts, said overlapping relation of the armature and the magnet pole piece serving to diminish the attraction of the magnet for the armature as the armature moves to its attracted position in addition to the reduction in strength of the magnet due to the decreased voltage on opening the contacts and thereby preventing the armature being held by the magnet in its attracted position.

3. In a regulator for storage battery charging, a vibrator comprising an electromagnet having pole pieces, a spring retracted movable armature bridging the gap between the pole pieces and having an interfitting overlapping relation with one of the pole pieces to diminish the attraction of the magnet therefor on approaching its attracted position, a variable speed generator for energizing the magnet and having a battery charging circuit and a shunt field circuit, a regulating resistance included in the shunt field circuit, and normally closed switch contacts short circuiting the regulating resistance and opened by the movements of the armature when attracted by the magnet, the combined influence of the introduction of the regulating resistance and of the interfitting overlapping relation of the armature and pole piece serving to prevent the armature being held by the pole piece.

4. In a regulator for storage battery charging, a vibrator comprising a shunt magnet coil and a series magnet coil, a spring retracted armature bridging the pole pieces of the magnet and having an interfitting overlapping relation with one of the pole pieces to reduce the attraction of the magnet therefor as the armature approaches its attracted position, a variable speed generator having a shunt field winding including a regulating resistance and having the shunt magnet coil connected across the terminals of its armature and having a battery charging circuit also connected across the terminals of its armature and including a storage battery and the series magnet coil, normally closed switch contacts short circuiting the regulating resistance, one of which contacts is carried by said armature so that the short circuit is removed and the regulating resistance included in the shunt field circuit when the magnet attracts the armature, the combined influence of the introduction of the regulating resistance and of the interfitting overlapping relation of the armature and pole piece serving to prevent the armature being held by the pole piece, a second spring retracted armature bridging across the pole pieces of the magnet, and a second pair of switch contacts normally opened and one of which is carried by the second armature, said second pair of switch contacts being included in and controlling the battery charging circuit.

5. In a vibrator, a magnet having pole pieces, a spring retracted movable armature bridging across the pole pieces and having cut away portions at its ends with a projection between them, the corresponding pole piece having projections at its end to fit within the cut away portions of the armature and a recess between the projections to receive the projection of the armature whereby the armature and said pole piece have an interfitting overlapping relation with each other in the attracted position of the armature, and a pair of switch contacts opened and closed by the movements of the armature.

6. In a vibrator, a magnet having pole pieces, a spring retracted movable armature bridging across the pole pieces, one of the pole pieces and the armature being interfitting so as to have an increasing overlapping relation as the armature approaches its attracted position to weaken the influence of the magnet on the armature, a pair of switch contacts opened and closed by the movements of the armature, and means controlled by the switch contacts for varying the magnet strength.

7. In a vibrator, a magnet having pole pieces, a spring retracted movable armature bridging across the pole pieces, one of the pole pieces and the armature being interfitting so as to have an increasing overlapping relation as the armature approaches its attracted position to weaken the influence of the magnet on the armature, a pair of switch contacts opened and closed by the movements of the armature, and a regulating resistance controlled by the switch contacts in circuit with the electromagnet for weakening the magnet strength, the combined influence of the regulating resistance and of the interfitting overlapping relation of the armature serving to prevent the armature being held by the pole piece.

8. In a generator output regulator, a regulating resistance, a magnet controlling same, and means for reducing the attractive effect of the magnet supplemental to the introduction of the resistance.

9. In a generator output regulator, a regulating resistance, and a magnet having an armature controlling the resistance, said armature having an overlapping relation with the pole piece of the magnet to reduce the attractive effect of the magnet supplemental to the introduction of the resistance.

In testimony whereof, I affix my signature, in presence of two witnesses.

STEPHEN F. BRIGGS.

Witnesses:
KATHERINE HOLT,
MARGARET R. FORRESTAL.